United States Patent Office 3,429,391
Patented Feb. 25, 1969

3,429,391
NONLINEAR COMPENSATING DEVICE FOR MAKING COMPATIBLE A TRANSDUCER AND ITS INTERPRETIVE INSTRUMENT
Campbell Dean Boadle, Pentwyn, Ponthir Road, Caerleon, Monmouthshire, Wales
Filed Dec. 1, 1966, Ser. No. 598,379
Claims priority, application Great Britain, Dec. 3, 1965, 514,540/65
U.S. Cl. 177—210                    9 Claims
Int. Cl. G01g 3/14

---

ABSTRACT OF THE DISCLOSURE

A weighing platform or vessel, a transducer or transducers, means for applying a load on the platform or vessel to the transducer or transducers so as to cause a signal dependent upon the load to be transmitted thereby, a measuring and/or indicating instrument for receiving the signal, and means for continuously varying the "characteristic" of the instrument so that it conforms to that of the transducer, which means comprise a potentiometer having means whereby the relative rotation of the potentiometer rotor and body may be varied.

---

*Description of invention*

This invention relates to electrical weighing apparatus.

Electrical weighing equipment of the type normally used consists of a weigh platform or vessel supported on one or more electrical transducers, or load cells, which generate a signal dependent on the load on the platform. This signal is transmitted over a cable, to the receiving instrument, where it is measured by an automatic or other measuring instrument and its magnitude indicated on an indicator, graduated in a suitable weight scale or used in a control system or for other purposes. The instrument and the weigh platform may be separated by an appreciable distance, and the flexibility afforded by such separation is one of the attractive features of this method of weighing.

For high accuracy in such a system, it is important that the characteristics of both the transducers and the instrument should be closely matched. The characteristic curve of these devices which is usually sought is a straight line; i.e. the load is directly proportional to the electric signal, the load being that applied to the weigh platform, or that indicated by the instrument. In the case of the instrument, which is usually a self balancing potentiometer, measuring a small AC or DC voltage signal, it is possible by careful selection of components and good design to fulfill the linear law requirement to a high degree of precision.

For the usual type of transducer however, it commonly happens that this curve is not quite linear, the departure being large enough to be noticeable and unacceptable in high precision systems. Although in a typical arrangement for example where the load cell transducers consist of a stiff spring to which is bonded in selected places four or more electrical resistance strain gauges coupled together to form a bridge network, these transducers are designed and constructed to produce a linear characteristic curve it has been found virtually impossible to achieve it.

The present invention aims to provide a method of overcoming these differences in characteristic.

In an electrical weighing apparatus according to the invention the load on a weighing platform or vessel is applied to a transducer or transducers which generate a signal dependent upon the load, and this signal being transmitted to a measuring and/or indicating instrument and means are provided for continuously varying the characteristic of the instrument so that it conforms to that of the transducer or transducers.

This may be achieved for example by employing a potentiomatic instrument and providing means for varying the relative rotation of the potentiometer rotor and body. Instead of the potentiometer body being securely fixed to the frame of the instrument it is mounted so as to be rotatable through a limited angle so as to provide the required compensation.

The invention is applicable to differences in characteristics irrespective of whether either of the characteristics of the transducer or instrument are linear, or whether they are both non linear.

The invention will now be described further by way of example and with reference to the accompanying drawings in which.

Figure 1:
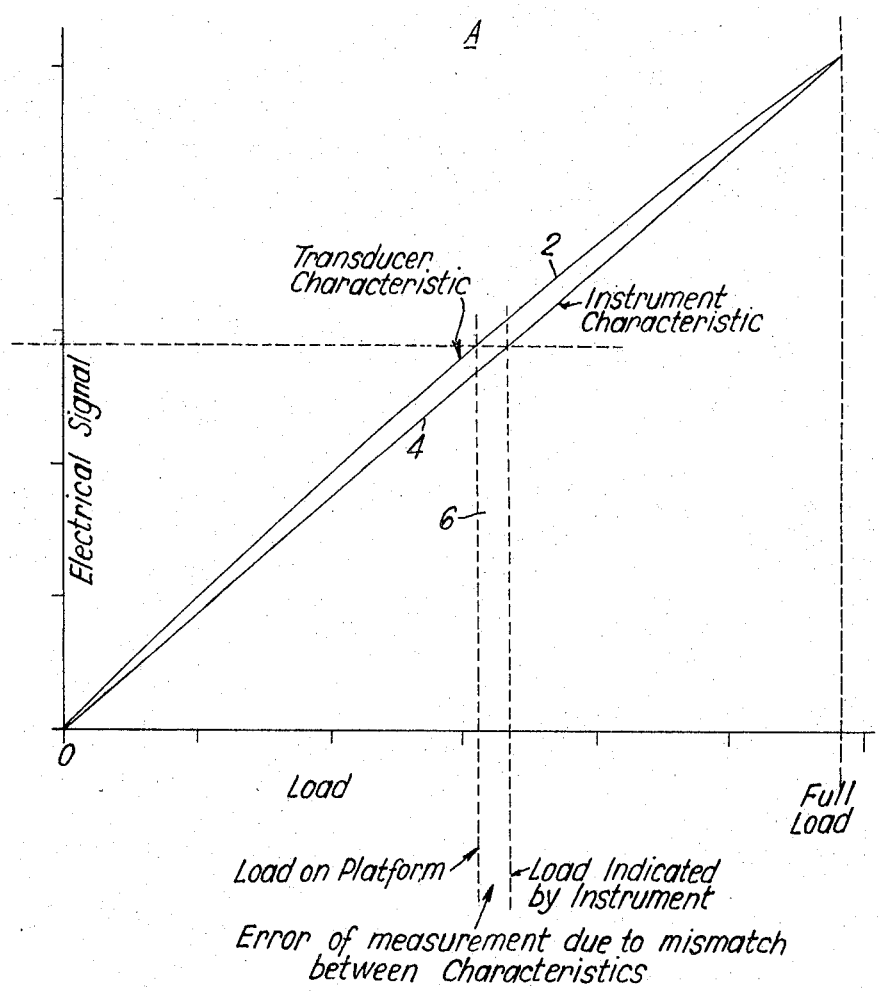
FIGURE 1 is a graph indicating variation between transducer characteristic and instrument characteristic.

If the characteristic curve of the load cells, as is commonly found, is not quite linear as is indicated by line 2 in FIGURE 1, while that of the instrument is linear to a high standard of accuracy as is indicated by line 4 in FIGURE 1, then small errors will appear in the weigher indication due to the departure between these two characteristics as is indicated by numeral 6. According to the present invention, means (to be described below) are provided for adjusting the characteristic of the indicating instrument so that it conforms as accurately as desired to that of the transducers.

Figure 3:
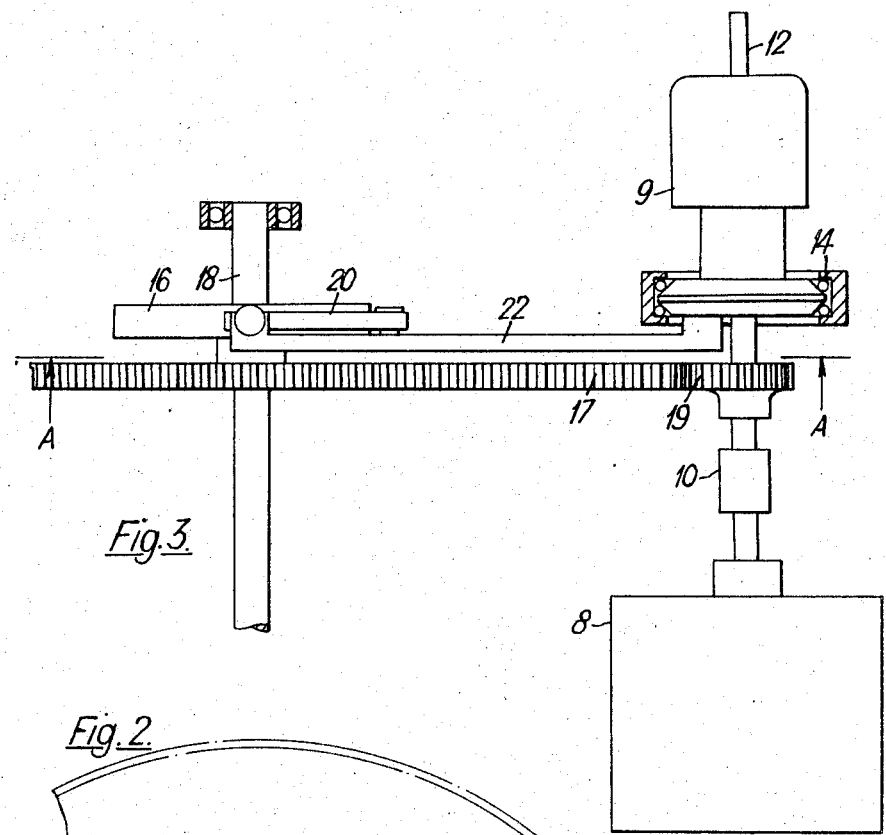
FIGURE 3 is a view of the apparatus in FIGURE 2 looking in the direction of the arrows AA.
Figure 2:
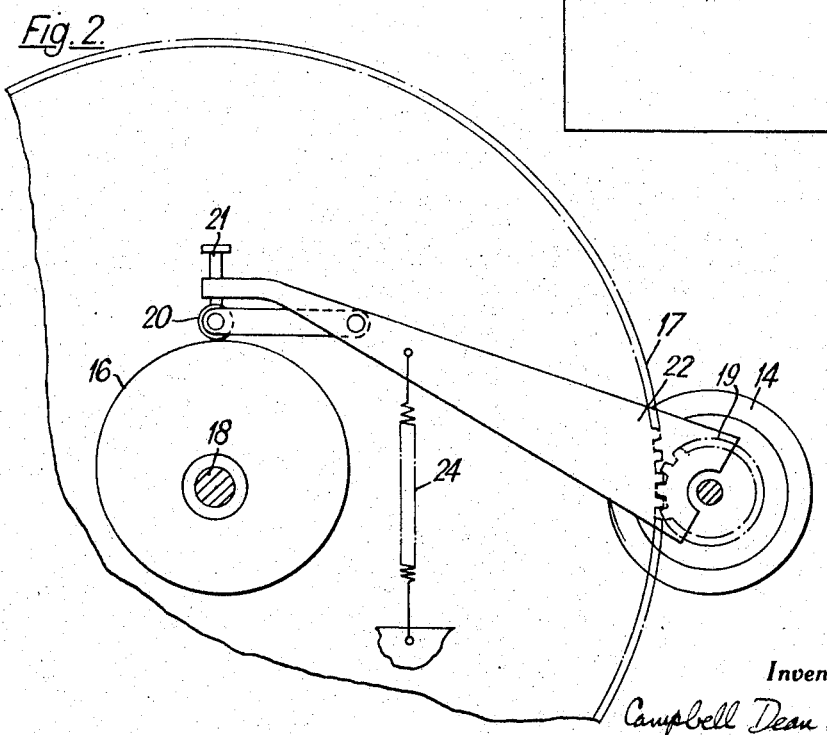
FIGURE 2 shows diagrammatically a typical apparatus according to the invention.

Referring to FIGURES 2 and 3 the balancing system consists of a servo motor 8 driving a precision potentiometer 9 which may be of the multi-turn type through a drive 10 which may be a gear train. The servo motor, usually of the two phase type, is powered on one phase by the main supply, and on the other by an amplified difference signal obtained from the transducer signal and a signal in opposition produced by the potentiometer. This difference signal may be further modified by additional signals injected into the circuit to compensate for the dead weight of structure on the load cells, tare weight of containers, etc., so that only the net weight of the load is registered by the instrument.

A drive 12 may be taken from the potentiometer drive to an indicator (not shown), suitably scaled to suit the capacity of the weigher, and which may be a pointer and dial, or a mechanical or electrical digitiser with direct digital display of the weight and a printer for printing the weight on a card or paper tape.

Corrections to the weight indicated are obtained by a variation in the relative rotation of the potentiometer rotor and body, the potentiometer body being mounted in a frictionless bearing 14 such as a double angular contact ball bearing instead of securely fixed to the frame of the instrument. It is made to rotate through a limited angle by means of a cam 16 of single lobe shape secured to a spindle 18 and geared from the potentiometer drive 10 through gears 17, 19 so as to complete one revolution or substantially a complete revolution as the potentiometer completes its range from no load to full load.

This cam 16 may be of any desired form to match the differences between the characteristic of the instrument and transducer over the load range. The cam drives a follower 20 attached to a radius rod 22 which is coupled directly to the body of the potentiometer. Alternatively there may be interposed between the two, a form of gearing designed to apply to the potentiometer body a rotation modified (e.g. amplified or reduced) from that experienced by the radius rod. Furthermore, this gearing may incorporate means for adjusting the gear ratio, and for adjusting the zero setting of the potentiometer, while the cam may incorporate means for adjusting its throw and angular relation to the potentiometer drive.

Taking the commonest form of nonlinearity experienced as an example, the instrument characteristic is linear as shown in FIGURE 1 to a high standard of accuracy while the transducer exhibits a slightly upwardly convex characteristic curve. Over the usual load ranges this convexity may be about $1/500$ of the full load. By constructing a cam of single lobe shape, it is possible to apply a slight correcting rotation to the potentiometer body, by means of the mechanism illustrated in FIGURES 2 and 3. Where the cam is a single lobe cam of small throw as the correction required is not large the follower 20 attached to the radius rod 22 bears on the cam under the influence of a spring 24, and the radius rod is connected to the potentiometer, the cam rotates and rocks the potentiometer body slightly, thus modifying the signal to the potentiometer, and hence the balance point, so that precisely the true weight is indicated irrespective of the nonlinearity of the transducers.

By making the cam of variable throw, and rotatable with respect to its drive shaft differences in the shape of the characteristic nonlinear curve of single convexity can be achieved. For other shapes of curves, of course, other shapes of cam would be required; but in these cases there would be relatively little scope for correction by adjustments such as those indicated.

By inserting an adjustment 21 between the radius rod and follower, a small zero adjustment may be inserted into the system. This adjustment may be provided by means of an electrical circuit including a variable potentiometer, whose contact resistance may not be constant over long periods of time, thereby introducing a small but significant uncertainty into the electrical measuring system. The transfer of the zero adjustment to a mechanical adjustment of the potentiometer body eliminates this uncertainty, as well as some expensive electrical components. The dead weight adjustment, which is similar in type to the zero adjustment may be similarly eliminated, being replaced by a fixed potentiometer signal and a small mechanical trimming of the signal applied to the potentiometer body as above. By this means, all electrical adjustments employing infrequently used electrical wipers on potentiometers, which may become a source of uncertainty in their electrical characteristics with the passage of time, are eliminated and replaced by a simple reliable mechanical adjustment.

By careful mechanical design the additional load applied to the servo system may be kept negligibly small, so that the accuracy of the balance point everywhere in the load range remains undisturbed. Further, as the additional cam drive is geared at a substantial reduction on speed below that of the potentiometer (1:9 being a likely ratio) the additional inertia introduced into the servo system is negligibly small, and the dynamical characteristics of the servo will remain undisturbed.

I claim:

1. An electrical weighing apparatus comprising a weighing platform or vessel, a transducer or transducers, means for applying a load on the platform or vessel to the transducer or transducers so as to cause a signal dependent upon the load to be transmitted thereby, a measuring and/or indicating instrument for receiving the signal and means for continuously varying the "characteristic" of the instrument so that it conforms to that of the transducer, which means comprise a potentiometer having means whereby the relative rotation of the potentiometer rotor and body may be varied.

2. An electrical weighing apparatus comprising a weighing platform or vessel, a transducer or transducers, means for applying a load on the platform or vessel to the transducer or transducers so as to cause a signal dependent upon the load to be transmitted thereby, a measuring and/or indicating instrument for receiving the signal and means for continuously varying the "characteristic" of the instrument so that it conforms to that of the transducer, which means comprise a potentiometer having a body rotatable on frictionless bearings whereby the relative rotation of the potentiometer rotor and body may be varied, a servomotor driving the potentiometer, a cam also driven by the servomotor, which cam has a profile corresponding to the desired modification of potentiometer characteristic, and a cam follower connected to the potentiometer body so as to cause rotation thereof in accordance with the profile of the cam.

3. An electrical weighing apparatus according to claim 2 in which the servo-motor is a two phase motor and in which one phase is powered by main supply and the other by an amplified difference signal obtained from the transducers and a signal in opposition produced by the potentiometer.

4. An electrical weighing apparatus according to claim 3 in which the difference signal is modified by additional signals to compensate for the dead weight structure on the load cells.

5. An electrical weighing apparatus according to claim 3 in which the difference signal is modified by additional signals to compensate for the tare weight of weighing containers.

6. An electrical weighing apparatus comprising a weighing platform or vessel, a transducer or transducers, means for applying a load on the platform or vessel to the transducer or transducers so as to cause a signal dependent upon the load to be transmitted thereby, a measuring and/or indicating instrument for receiving the signal and means for continuously varying the "characteristic" of the instrument so that it conforms to that of the transducer, which means comprises a potentiometer having a body rotatable in frictionless bearings whereby the relative rotation of the potentiometer rotor and body may be varied, a servo-motor driving the potentiometer, a cam also driven by the servo-motor, which cam has a profile corresponding to the desired modification of potentiometer characteristic, and means for adjusting the cam follower relatively to the potentiometer body.

7. An electrical weighing apparatus according to claim 6 in which the difference signal is modified by additional signals to compensate for the tare weight of weighing containers.

8. An electrical weighing apparatus according to claim 6 in which the servo-motor is a two phase motor and in which one phase is powered by main supply and the other by an amplified difference signal obtained from the transducers and a signal in opposition produced by the potentiometer.

9. An electrical weighing apparatus according to claim 8 in which the difference signal is modified by additional signals to compensate for the dead weight structure on the load cells.

References Cited

UNITED STATES PATENTS

| | | |
|---|---|---|
| 2,771,579 | 11/1956 | Ruge. |
| 2,998,090 | 8/1961 | Watson _____ 177—211 |
| 3,217,249 | 11/1965 | Scott _____ 324—63 |
| 3,228,240 | 1/1966 | Ormond _____ 73—88.5 X |
| 3,350,927 | 11/1967 | Senour _____ 73—88.5 |

RICHARD B. WILKINSON, *Primary Examiner.*

GEO. H. MILLER, JR., *Asisstant Examiner.*

U.S. Cl. X.R.

324—63